US006763328B1

(12) United States Patent
Egolf et al.

(10) Patent No.: US 6,763,328 B1
(45) Date of Patent: Jul. 13, 2004

(54) METHOD AND DATA PROCESSING SYSTEM FOR EMULATING VIRTUAL MEMORY UTILIZING THREADS

(75) Inventors: David A. Egolf, Glendale, AZ (US); Stefan R. Bohult, Phoenix, AZ (US); Bruce A. Noyes, Phoenix, AZ (US); Chad Farmer, Phoenix, AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 813 days.

(21) Appl. No.: 09/594,623

(22) Filed: Jun. 15, 2000

(51) Int. Cl.[7] .............................................. G06F 9/455
(52) U.S. Cl. ........................... 703/27; 703/26; 712/227; 711/203; 709/100
(58) Field of Search ..................... 703/23–28; 709/100; 711/200; 712/227

(56) References Cited

U.S. PATENT DOCUMENTS

| 6,009,261 A | * 12/1999 | Scalzi et al. ................... 703/26 |
| 6,199,152 B1 | * 3/2001 | Kelly et al. ................... 711/207 |
| 6,480,952 B2 | * 11/2002 | Gorishek et al. ........... 712/227 |
| 6,496,847 B1 | * 12/2002 | Bugnion et al. ............... 709/1 |

OTHER PUBLICATIONS

Brorsson, "A Decentralized Virtual Memory Scheme Implemented on an Emulated Multiprocessor," IEEE Proceedings of the 22nd Annual Hawaii International Conference on System Sciences, vol. 1 pp. 286–295 (Jan. 1989).*

GCOS8 Operating System, Programmer's Guide, DPS9000G Assembly Instructions (67 A2 RG95 REV03, Oct. 1999, pp. 3–1 through 3–22, 4–1, 4–7, 4–11, 4–26, 4–27, 4–34, 4–35, 4–36, 4–38, 4–39, 4–52, 5–59, 5–60 through 5–85.

* cited by examiner

Primary Examiner—Samuel Broda
(74) Attorney, Agent, or Firm—Bruce E. Hayden; Faith F. Driscoll

(57) ABSTRACT

In an emulation of a multiprocessor Target computer system on a Host computer system, Host virtual memory addresses are mapped and utilized as Target virtual memory addresses. Target virtual memory control tables are setup accordingly. Each Target processor is mapped to a Host thread. When a page fault is detected by the Host operating system, it is checked to see if it belongs to the Target system, and if it does, the executing thread transfers its processor identity to a free thread, and then completes processing the page fault. Upon completion, it marks the processes that had been executing on that thread and processor as available for execution, then blocks until activated. Another thread, upon dispatching that process, wakes up the blocked thread and transfers its processor identity to that thread, which continues to execute the interrupted process.

21 Claims, 8 Drawing Sheets

METHOD AND DATA PROCESSING SYSTEM FOR EMULATING VIRTUAL MEMORY UTILIZING THREADS

CROSS REFERENCE TO RELATED APPLICATIONS

This application is related to our copending patent application entitled, "METHOD AND DATA PROCESSING SYSTEM FOR EMULATING VIRTUAL MEMORY WORKING SPACES" filed on even date herewith and assigned to the assignee hereof which issued as U.S. Pat. No. 6,480,845 on Nov. 12, 2002.

This application is related to our copending patent application entitled, "DATA STRUCTURE FOR EMULATING VIRTUAL MEMORY WORKING SPACES" filed on even date herewith and assigned to the assignee hereof which issued as U.S. Pat. No. 6,446,094 on May 27, 2002.

FIELD OF THE INVENTION

The present invention generally relates to processor emulation software, and more specifically to virtual memory paging during emulation of a target multiprocessor system.

BACKGROUND OF THE INVENTION

Emulating a first computer architecture on a second computer architecture is a well known technique in the area of data processing. It is becoming more common as the cost of developing new generation computer architectures continues to escalate. A program, called an "Emulator", on a data processing system with the second computer architecture executes code designed for the first computer architecture: in essence pretending that it has the first computer architecture. The computer system having the second computer architecture and that executes the Emulator program is termed the "Host" computer system. A virtual computer system having the first ("emulated") computer architecture is termed the "Target" system. Often both Target user and operating system software is executed together by the Emulator on the Host system, with the Target operating system managing resources for the Target user programs.

The computer industry has seen increasing interest in Legacy Emulation on commodity-based platforms over the past few years, such as the Intel IA-64 architecture. Through the literature and other sources, we are aware of about ten companies with research and/or development projects in this area. A common experience among them is recognition that the cost of emulation limits the achievable performance to equivalence with mid-range mainframe systems at this time. Only two claims we have seen set expected fairly high performance and these assume changes to the target OS to reduce the amount of code actually emulated in performing services for the target applications.

In order to strictly emulate the hardware instruction set of the Target system, software must transform the memory addresses generated by the emulation of the Target machine into addresses on the Host machine. One very critical element of Emulator performance is the matter of address mapping between the Target and Host systems. In virtual memory architectures, this critical element is the translation of Target virtual addressees into Host virtual addresses.

FIG. 1 is a block diagram illustrating an illustrative multiprocessor Host system utilized to emulate a Target system with a narrower word size. In the preferred embodiment disclosed below, the Host system utilizes 64-bit words, whereas the Target system supports 36-bit words. A multiprocessor system is shown in order to provide the level of performance necessary to emulate large-scale enterprise level Target systems. The multiprocessor system 40 shows two (2) microprocessors 42, each containing its own local cache memory 44. Some examples of microprocessors include Pentium II and IA-64 microprocessors from Intel Corporation, PowerPC microprocessors from Motorola, Inc. and IBM, and SPARC processors from Sun Microsystems. The cache memory 44 is typically implemented as extremely high-speed static random access memory (SRAM). The cache memory 44 may be implemented on the same semiconductor die as the microprocessor 42, or may be implemented as part of a multi-chip-module (MCM) with the microprocessor 42. In any case, the cache memory 44 for each microprocessor 42 is dedicated to that microprocessor 42. Note here that a single level of cache memory 44 is illustrative. Other cache memory configurations are within the scope of this invention. Note also that two microprocessors are shown. This is for illustrative purposes, and it is understood that the invention disclosed below envisions emulating a multiprocessor Target system on either a single processor or a multiprocessor Host system.

The two shown microprocessors 42 are coupled by and communicate over an intraprocessor bus 46. One of the functions of this intraprocessor bus 46 is to allow the two microprocessors 42 to communicate sufficiently so as to maintain coherence between their respective cache memories 44. A single bus has been shown. However, multiple busses are also within the scope of this invention.

Also coupled to the intraprocessor bus 46 is a Host bridge 50. This provides communications between the microprocessors 42 and the remainder of the computer system 40. Coupled to the Host Bridge 50 is Host memory 54. This is typically Dynamic Random Access Memory (DRAM). However, other types of memory may be utilized, including SRAM. Host memories 54 typically contain several orders of magnitude more memory than the cache memories 44.

Also coupled to the Host Bridge 50 is a system bus 60. The system bus 60 is utilized to couple the system 40 to lower speed peripheral devices. These lower speed peripheral devices can include display monitors, keyboards, communications devices, and the like (not shown here). Also coupled to the system bus are disk drives and other forms of storage capable of permanently storing data for the computer system 40. Shown in this figure are a Host disk drive 62 and a Target disk drive 68. The Host disk drive 62 typically contains the software required to emulate the Target system on the Host system. The Target disk drive 68 contains the software being emulated. It should be noted that the Host disk drive 62 is shown distinct from the Target disk drive 68. Additionally, only a single Host disk drive 62 and Target disk drive 68 are shown. It is shown this way for illustrative purposes. However, the present invention also envisions combining the two on shared drives. It must also be noted that the Target disk drive 68 will often actually consist of a large number of different physical disk drives. This is especially true when Host systems capable of supporting enterprise level databases are emulated.

Memory is considered herein a relatively high speed machine readable medium and includes Volatile Memories, such as DRAM 54, and SRAM 44, and Non-Volatile Memories (not shown) such as, ROM, FLASH, EPROM, EEPROM, and bubble memory. Secondary Storage 62, 68 includes machine-readable media such as hard disk drives, magnetic drum, and bubble memory. External Storage (not shown) includes machine-readable media such as floppy disks, removable hard drives, magnetic tape, CD-ROM, and even other computers, possibly connected via a communications line. The distinction drawn here between Secondary Storage 62, 68 and External Storage is primarily for convenience in describing the invention. As such, it should be appreciated that there is substantial functional overlap between these elements. Computer software such as Target emulation software and user programs can be stored in a Computer Software Storage Medium, such as Memory 44, 54, Secondary Storage 62, 68, and External Storage. Executable versions of computer software cane be read from a Non-Volatile Storage Medium such as External Storage (not shown), Secondary Storage 62, 68, and Non-Volatile Memory (not shown), and loaded for execution directly into Volatile Memory 44, 54, executed directly out of Non-Volatile Memory, or stored on the Secondary Storage 62, 68 prior to loading into Volatile Memory 44, 54 for execution.

Virtual memory provides a processor with an apparent or virtual memory address space typically much larger than the real memory actually employed. It also allows provides a contiguous address space employing discontiguous real memory pages. In the GCOS® 8 environment, this capability consists of a directly addressable virtual space of 2**43 bytes and the mechanisms for translating this virtual memory address into a real memory address.

The remainder of the Background section discusses virtual memory addressing in the GCOS 8 environment sold by assignee of this invention. In order to provide for virtual memory management, assignment, and control, the 243-byte virtual memory space is divided into smaller units called "Working Spaces" and segments. The 243 bytes of virtual memory space are divided into 512 234 byte Working Spaces (WS). Each WS has a unique WS number (WSN). These Working Space numbers are used to generate a particular virtual memory address. They are obtained indirectly from one of the eight 9-bit WS registers, or directly from one of the descriptor registers. Each Working Space is further broken into 222 1024 (210)-word or 4096 (1012)-byte virtual pages. Each virtual page, when present, will map to a physical or "real" page of the same size. Note that the GCOS 8 hardware, but currently not the GCOS 8 operating system, additionally supports an XV mode that provides for 18 bit Working Space numbers supporting 2**18 active Working Spaces.

A segment is a part of a Working Space and may be as small as one byte or as large as 2**32 bytes for an extended segment. Thus, unlike the fixed size of a Working Space (WS), a segment size is variable. Segments are addressed by a 72-bit data item called a "descriptor" or a "segment descriptor". Segments can be viewed as "framing" a portion of a Working Space. Multiple segments may frame different portions of the same Working Space, and may even overlap. Typically segments are setup by the operating system, but may be shrunk in size or otherwise reduced in capabilities by unprivileged user programs.

There are various segment types which discriminate on the type of data referenced and/or the sizes of the areas referenced. For the purposes of this description, the fact that all memory references are performed by a combination of a virtual address computation using content from these descriptors is of significant importance.

The following is an example of a virtual address computation using specifically a standard segment descriptor. This is for illustrative purposes only, and the present invention includes all virtual memory references independent of the use of descriptors.

When a virtual address is generated, a portion of the information comes from a segment descriptor contained in a register such as the instruction segment register (ISR). For operands, the descriptor may be contained in other segment descriptor registers. The area of virtual memory constituting a segment is "framed" by its segment descriptor by defining a base value relative to the base of the Working Space and a bound value relative to the base of the segment.

For all memory accesses, a virtual address must be generated. This includes operand or descriptor loads and stores, as well as instruction fetches. The mechanics of generating the virtual memory address depends on whether the involved segment descriptor is a standard segment descriptor or a super segment descriptor. Thus the procedures described below for generating an operand virtual address with a standard segment descriptor also applies to virtual address generation for accessing the instruction, argument, parameter, and linkage segments, since the registers holding these segment descriptors can only contain standard segment descriptors (with the exception of the instruction segment register (ISR) which may alternatively contain extended descriptors in EI mode).

FIG. 2 is a block diagram illustrating virtual address generation using a standard segment descriptor in standard mode in a GCOS 8 system. The effective address (EA) 110 is typically generated during instruction execution. Typically, during each instruction cycle two different effective addresses 110 are generated: the address of the instruction to fetch for execution, and an instruction operand address. The virtual address generation shown here must be done for both. The effective address (EA) 110 is typically generated differently for different types of instructions and instruction modification types. For example, the effective address (EA) 110 may be loaded from memory, generated directly from the instruction, or be calculated as the sum of one or more registers and a constant. The GCOS 8 architecture also supports an indirect addressing mode that provides that an operand address specifies the address of an operand address, or the address of an address of an operand address, etc.

The Effective Address (EA) 110 in NS mode consists of four parts: sixteen leading zeroes 112; an 18-bit effective word address 114; a 2-bit byte offset within word 116; a 4-bit bit offset within byte 118. The Effective Address (EA) 110 is added to a segment base address 120. The segment base address 120 comprises: a segment word address 124; and a segment byte offset 126. The segment base address is provided from one of the system segment registers discussed further in FIGS. 11–14. The summation 130 of the effective address (EA) plus the segment base comprises: a 2-bit Working Space modifier 132; a 32-bit word offset 134; and a 2-bit byte offset 136. The 2-bit Working Space modifier 132 is ORed with the lower 2-bits 139 of a 9-bit Working Space number 138 to generate an effective Working Space number 142. A 47-bit virtual address 140 is then generated comprising: the effective 9-bit Working Space number 142; a 32-bit word address within Working Space 144; a 2-bit byte offset within word 146; and a 4-bit bit offset within byte 148, from: the Working Space number 135 ORed with the Working Space number in the EA+Base 132; the EA+Base 134; and the bit offset in the Effective Address 118. It should be noted here that since the vast majority of GCOS 8 instructions executed do not utilize the virtual memory bit offset 148, it can be efficiently carried separately from the remainder of the virtual address 140 for those rare cases where it is needed.

The remainder of the Background section is used to illustrate virtual to real address translation. The example shown is for GCOS 8 NS mode address generation utilizing section tables in the virtual memory map hierarchy. This is in accordance with the preferred embodiment of the present invention. However, it should be noted that this description is illustrative. Many other computer architectures utilize similar virtual memory map hierarchies, and are within the scope of this invention.

FIG. 3 is a diagram illustrating the format of a virtual address when addressing a Working Space described by section tables (PTDW 150 T field 158=01). The virtual address 190 contains: a 9-bit effective Working Space number 182; a 12-bit section number 192; a 10-bit page number 194; a 10-bit word offset within page 186; a 2-bit byte offset within word 187; and a 4-bit bit offset within byte 188. The virtual address 190 in this FIG. 9 corresponds to the virtual address 140 shown in FIGS. 2 and 3.

FIG. 4 is a block diagram that illustrates virtual address mapping 220 using a section table in the GCOS 8 architecture using the virtual address format shown in FIG. 3. A page directory base register (PDBR) 202 contains a pointer to a Working Space Page Table Directory (WSPTD) 204. The WSPTD 204 contains an array of Page Table Directory Words (PTDW) 150 (see FIG. 4). The effective Working Space number 182 is utilized to index into the WSPTD 204 in order to select the appropriate PTDW 206. The selected Page Table Directory Word (PTDW) 206 in turn addresses a section table (SCT) 222. The section table (SCT) 222 contains Page Table Base Words (PBW) 164 (see FIG. 5). The section number 192 is utilized to index into the section table (SCT) 222 to address a Page Table Base Word (PBW) 224. The selected PBW 224 addresses a Page Table (PT) 212. Page Tables (PT) 212 contain Page Table Words 170 (see FIG. 6). The page number 194 portion of the virtual address 190 is utilized to index into the Page Table (PT) 212 to select the appropriate Page Table Word 214. The selected Page Table Word (PTW) 214 addresses one page of real memory. The word offset 186 portion of the virtual address 190 is then utilized to index into the selected page of memory 216 to address the selected word 218. The byte 187 and bit 188 offsets of the virtual address 190 are then utilized to index into the selected word 218, when necessary.

It should be noted that there are various flags and fields in each of the control words throughout this hierarchy. The use of this invention will preclude not only the necessity, but the possibility of access to these flags and fields by the emulated operating system. These data elements fall into two categories: (1) those employed for the purposes of managing the real memory mapped to the virtual space, and (2) those employed to control access to the virtual memory for purposes of security and data integrity. An example of the first category is a flag employed to indicate that a page of memory has been accessed. An example of the second category is the CPU write flag in the PTW.

Since the management of the virtual memory devolves to the host operating system, direct access to flags and fields of the first class is not necessary. Note though that this implies that the hosted operating system can operate within the virtual memory management policies enforced by the host operating system.

The emulated hardware will typically need to continue to enforce the access rights for emulated memory accesses. Therefore, it is preferred that the host hardware supplies a superset of the access control required by the emulated hardware and that the host operating system supplies suitable mechanisms for the emulation to exert the policies of the emulated operating system. In most cases this capability will not extend beyond the ability to control read and write access to individual pages and the ability to "pin" pages of memory so that they are not eligible for swap. Some implementations may have additional requirements such as the mapping of contiguous real memory pages for the benefit of hardware drivers. These details are beyond the scope of this description. It is assumed that anyone employing this invention has separately addressed this issue.

FIG. 5 is a diagram of the format of a page table directory word (PTDW) 150 in the GCOS 8 architecture.

TABLE T-1

Page Table Directory Word (PTDW) Format

| Ref | St | Ed | B# | Field Name | Field Description |
|---|---|---|---|---|---|
| 152 | 00 | 17 | 18 | PT/SCT Base | Page table/Section table base |
| 154 | 18 | 19 | 2 | Q | Forces isolation of WS# |
| 156 | 20 | 20 | 1 | P | Presence bit: |
|  |  |  |  |  | 0 - not present |
|  |  |  |  |  | 1 - present |
| 158 | 21 | 22 | 2 | T | Type of page/section table: |
|  |  |  |  |  | 00 - Dense page table |
|  |  |  |  |  | 10 - Fragmented page table |
|  |  |  |  |  | 01 - Section table |
|  |  |  |  |  | 11 - Forces fault to occur |
| 160 | 23 | 23 | 1 | RFU | Reserved for Future Use |
| 162 | 24 | 35 | 12 | PT/SCT size | Size of PT/SCT |

The PCT/SCT base 152 is a modulo 1024 (210) base address of a page table (PT) or section table (SCT). The PT/SCT size 162 field contains different information depending on the type of page table involved. For a dense page table (T=00), bits 24–35 indicate the modulo 64 size of the page table (PT). For a section table (T=01), bits 30–35 indicate the modulo 64 size of the SCT. Fragmented page tables (T=10) are not supported by the GCOS 8 operating system. If bits 30–35 are zero, a size of 64 words are assumed, and bits 24 through 29** are ignored.

FIG. 6 is a diagram of the format of a page table base word (PBW) 164 in the GCOS 8 architecture. Page table base words (PBW) 164 are utilized to address page tables (PT) and are the entries in a section table (SCT). The format of a 36-bit page table base word (PBW) 164 is shown in table T-2:

TABLE T-2

Page Table Base Word (PBW) Format

| Ref | St | Ed | B# | Field Name | Field Description |
|---|---|---|---|---|---|
| 152 | 00 | 17 | 18 | PT Base | Page table/Section table base |
| 160 | 18 | 19 | 2 | RFU | Reserved for Future Use |
| 156 | 20 | 20 | 1 | P | Presence bit: |
|  |  |  |  |  | 0 - not present |
|  |  |  |  |  | 1 - present |
| 166 | 21 | 22 | 2 | MBZ | Must be zero |
| 160 | 23 | 31 | 9 | RFU | Reserved for Future Use |
| 162 | 32 | 35 | 4 | PT size | Size of Page Table |

The PT base field 152 contains the modulo 1024 (210) base address of a dense page table. The PT size field 162** contains the modulo 64 size of a dense page table. If it is zero, a page table size of 64 words is assumed.

FIG. 7 is a diagram of the format of a page table word (PTW) 170 and are the entries in a page table (PT) in the GCOS 8 architecture. Each page table word (PTW) 170 describes one page of real memory. The format of a 36-bit page table word (PTW) 170 is shown in table T-3:

TABLE T-3

Page Table Word (PTW) Format

| Ref | St | Ed | B# | Field Name | Field Description |
|-----|-----|-----|-----|------------|-------------------|
| 172 | 00 | 17 | 18 | Real Memory Address | Main memory address of the Memory Page. |
| 174 | 18 | 27 | 10 | RFU | Reserved for Future Use |
| 176 | 28 | 28 | 1 | R | Reserved for Software |
| 177 | 29 | 29 | 1 | MBZ | Must be Zero |
| 178 | 30 | 35 | 6 | Control | Control Field Bits:<br>30 - CPU page present<br>31 - Write permitted<br>32 - Housekeeping<br>33 - IO page present<br>34 - Page modified<br>35 - Page Accessed |

The real memory address field contains the real address of the Memory Page.

FIG. 8 is a diagram that illustrates the contents of segment descriptor registers in a GCOS 8 environment. Thirteen segment descriptor registers are supported in the GCOS 8 architecture, and they are: eight Segment Descriptor Registers (DR0 through DR7) for operand addressing; an Argument Stack Register (ASR); a Data Stack Descriptor Register (DSDR); an Instruction Segment Register (ISR); a Linkage Segment Register (LSR); and a Parameter Segment Register (PSR). In the GCOS 8 environment, segment descriptors are 72-bits in size and are used to describe a contiguous subset of a Working Space.

FIG. 8 is a diagram illustrating the segment register representation of a standard segment descriptor. This is representative of the other types of segments supported by the GCOS 8 architecture. The segment register representation 302 comprises two 36-bit words stored in two words of memory or in a single 72-bit register. The format of the segment register representation is shown in table T-4:

TABLE T-4

Standard Segment Descriptor 302 Format

| Ref# | Wd | St | Ed | B# | Field Name | Field Description |
|------|-----|-----|-----|-----|------------|-------------------|
| 310 | 0 | 00 | 19 | 20 | Bound | Segment upper bound |
| 312 | 0 | 20 | 28 | 9 | Flags | Flags:<br>20 - Read allowed<br>21 - Write allowed<br>22 - Store by STDn allowed<br>23 - Cache use control<br>24 - NS/ES mode<br>25 - Execute allowed<br>26 - Privilege required<br>27 - Bound valid<br>28 - Segment available |
| 314 | 0 | 29 | 31 | 3 | WSR | Working Space Register |
| 316 | 0 | 32 | 35 | 4 | Type | Segment Descriptor Type<br>0 - frames operand space<br>1 - frames descriptor space<br>12 - extended descriptor |
| 318 | 1 | 0 | 35 | 36 | Base | Segment Base Address |

The 3-bit Working Space Register (WSR) 314 field designates one of eight 9-bit Working Space registers. The contents of the selected WSR 314 are retrieved and used as the Working Space for the segment. The 20-bit bound field 324 contains the maximum valid byte address within the segment. The 36-bit base field 318 contains a virtual byte address that is relative to the start of the designated Working Space defined by the WSR 314. Bits 0:33 are a 34-bit word address, and bits 34:35 identifying a 9-bit byte within the word.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

Figure 1:
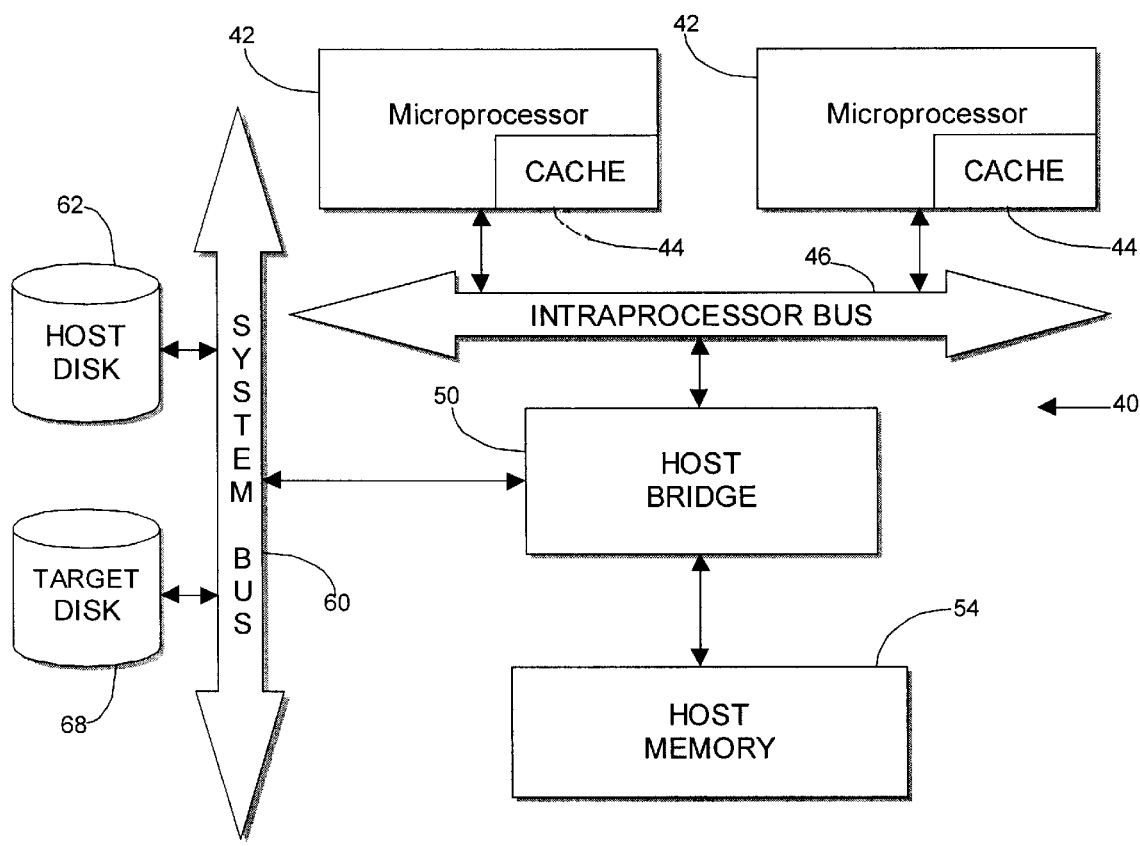
FIG. 1 is a block diagram illustrating an illustrative multiprocessor Host system utilized to emulate a Target system with a narrower word size.
Figure 2:
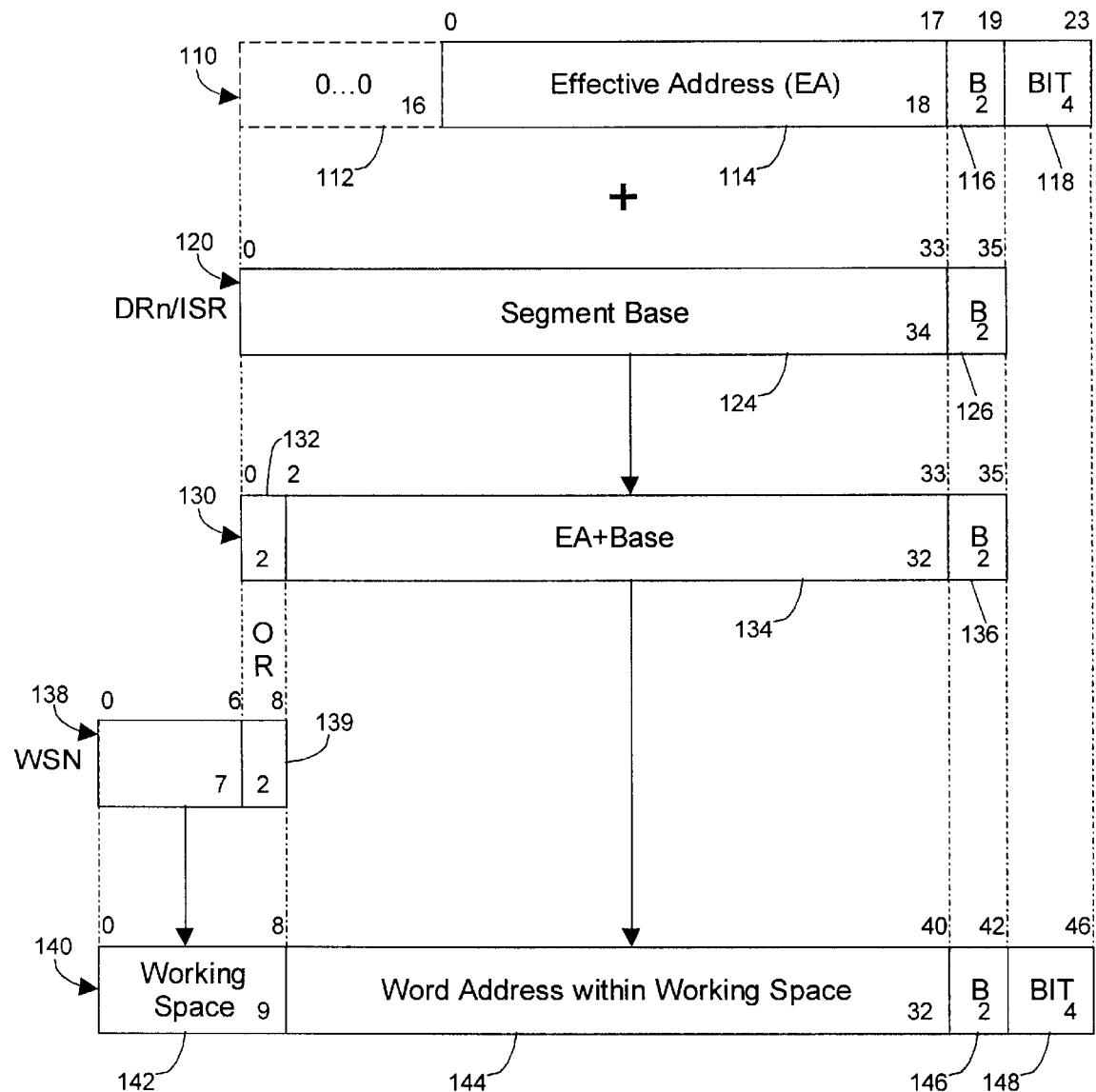
FIG. 2 is a block diagram illustrating virtual address generation using a standard segment descriptor in standard mode in a GCOS 8 system.
Figure 3:
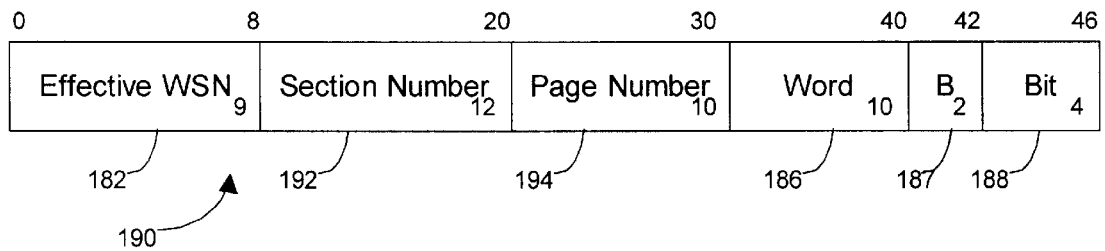
FIG. 3 is a diagram illustrating the format of a virtual address when addressing a Working Space described by section tables.
Figure 4:
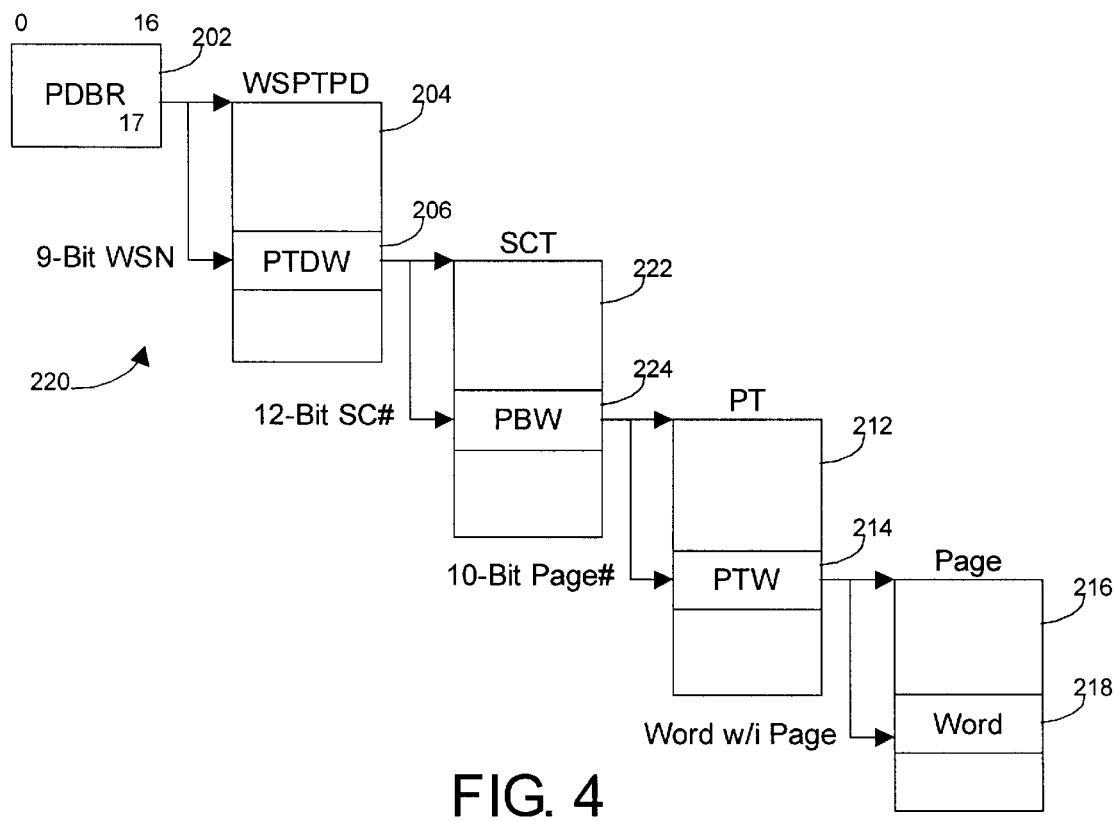
FIG. 4 is a block diagram that illustrates virtual address mapping using a section table in the GCOS 8 architecture and the virtual address mapping shown in FIG. 9.
Figure 5:
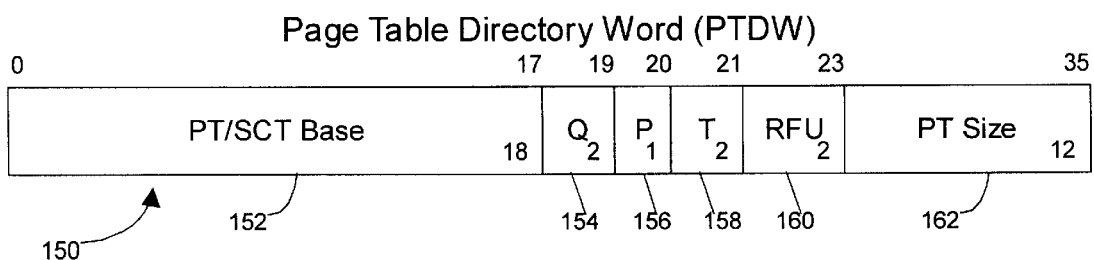
FIG. 5 is a diagram of the format of a page table directory word (PTDW) in the GCOS 8 architecture.
Figure 6:
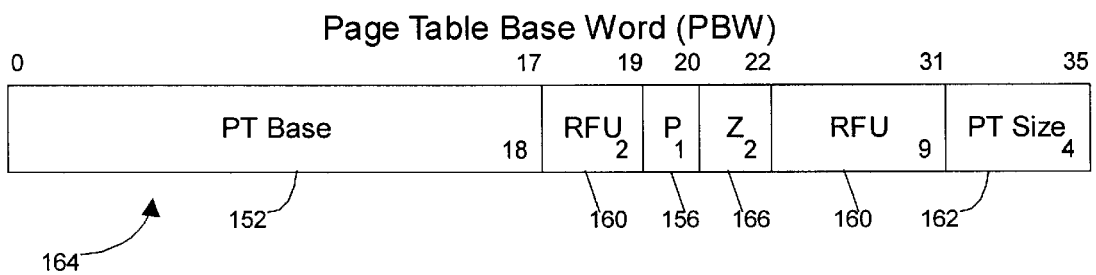
FIG. 6 is a diagram of the format of a page table base word (PBW) in the GCOS 8 architecture.
Figure 7:
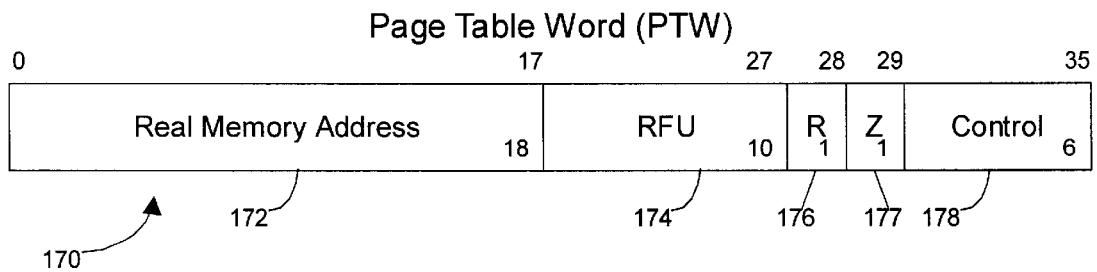
FIG. 7 is a diagram of the format of a page table word (PTW) in the GCOS 8 architecture.
Figure 8:
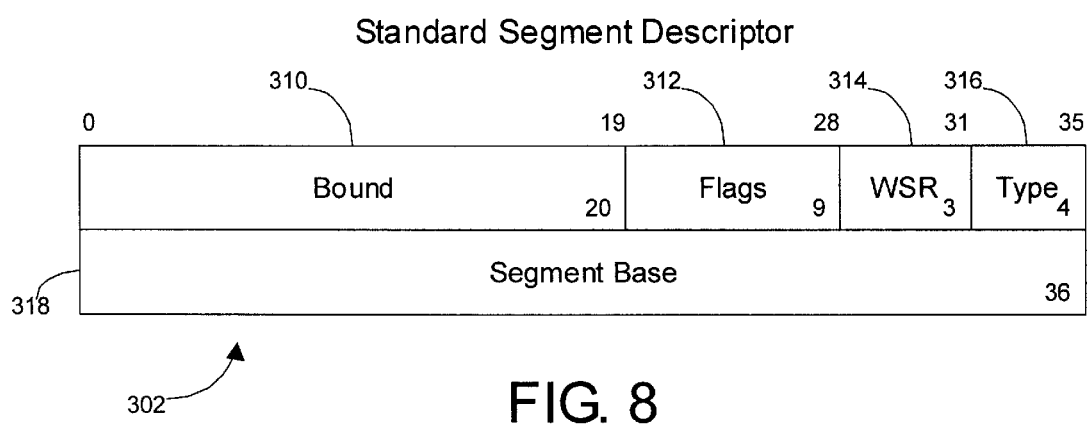
FIG. 8 is a diagram that illustrate the contents of a representative segment descriptor registers in a GCOS 8 environment.

In an emulation of a multiprocessor Target computer system on a Host computer system, Host virtual memory addresses are mapped and utilized as Target virtual memory addresses. Target virtual memory control tables are setup accordingly. Each Target processor is mapped to a Host thread. When a page fault is detected by the Host operating system, it is checked to see if it belongs to the Target system, and if it does, the executing thread transfers its processor identity to a free thread, and then completes processing the page fault. Upon completion, it marks the processes that had been executing on that thread and processor as available for execution, then blocks until activated. Another thread, upon dispatching that process, wakes up the blocked thread and transfers its processor identity to that thread, which continues to execute the interrupted process.

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The DPS 9000 family of mainframe computers sold by assignee of this invention has evolved from a 1960's design similar to the IBM 704 by the addition of string handling instructions in the early 1970s, and by a major extension in the late 1970s which added virtual memory and security features built on a capability architecture.

The word size in these systems is 36 bits. An archaic 6-bit code set is packed 6 alphanumeric characters per word. (ANSI 8-bit code has long been supported and is stored with a ninth padding bit at four characters to the word. A single 72 bit double length AQ register is separately accessible as the Arithmetic register and the Quotient register by various instructions. There are 8 index registers, augmented with 8 "address" registers employed with the string instructions. Finally, 8 "descriptor" registers hold capability tokens delimiting segments of virtual address space. The most commonly used of these 72 bit tokens provide both a base address (2**34-1 bytes) and a bound (up to 1 MB) plus flags for read, write, and other "permissions". Standard segments may begin on any byte and be as small as one byte long. The base can be in any of 512 "Working Spaces" that subdivide the 8 terabyte virtual address space. There are also five process definition descriptor registers including one that frames the current instruction segment. The description above is for illustrative purposes only, and is thus a simplification of the reality.

Address generation begins with the operand address part of each instruction word, optionally adds the contents of an index register, and optionally adds the contents of an Address register to form the Effective Address. Effective addresses are relative to an implied or explicit segment descriptor. Address generation then adds the effective address to the base portion of a "descriptor" held in one of the descriptor registers in the processor. Overflow and bounds checking are performed to assure the resulting address is within the segment.

The result is a 43-bit virtual address that must then be translated to a "real" address through a tree of page table data structures. This translation information is rooted in a processor register framing 512 Page Table Directory Words, one for each Working Space subdivision of the total system virtual address space. A field in the segment descriptor selects one of these and the translation proceeds through section tables and page tables to develop the real address of the referenced word. This translation is described in more detail in FIGS. 2 through 15 above.

The GCOS 8 data processing system sold by assignee for operation on its DPS 9000 family of mainframe computers has a complex 36-bit word architecture. In the preferred embodiment, a Target computer system is emulated on a Host computer system having a different word size. In that preferred embodiment, the Host computer system has a 64-bit word size. One such Host computer architecture having a 64-bit word size is the Intel IA-64 architecture. However, other Host and Target architectures are within the scope of this invention.

The virtual to real translation is accelerated in the hardware implementations by caching of the PTDW words associated with the Working Space registers and use of a fully associative cache for the PTW words. Providing an effective similar acceleration mechanism presents one of the important challenges for emulation.

In the GCOS 8 Operating System, virtual memory is demand paged at the Working Space level. Page size is 1024 words and memory comes in two "colors" determined by a bit in the page table word representing the page. This provides for special pages to isolate the page tables, descriptors (the capability tokens) and code using highly privileged instructions.

Paging supports a virtual address space larger than the real memory allocated to a process. In some situations, a Target OS will entirely remove a process from memory for a period of time. This is called "swapping" and frees the Working Space the process had been using.

One means of improving performance for the emulated applications is to replace selected portions of the Target operating system with Host architecture code to perform the same functions. The mechanism to switch from emulation to a block of Host architecture code and return to the Emulator at its conclusion is not expected to be very costly. Because there are very few cases of isolated functions that can be encapsulated with their data, access to data in the emulated memory region will usually be necessary from such blocks of Host architecture code. This can be relatively costly if both the segment bounds checking and page level protection mechanisms are to be maintained in references from Host architecture code to data in the emulated memory.

Two methods are described here to pass arguments to blocks of Host architecture code. In the first method, DPS 9000 word addresses and register contents would be copied to intermediate storage and passed by value for processing by the Host architecture code. This method will be limited to those functions for which all required Target system data is known at the time of call and for which the amount of data is relatively small.

For more complex functions a second method is preferred. As register and memory values are needed, they will be requested by calling the Emulator. The Emulator can marshal register values appropriately directly from the emulation. The Target system virtual address of the required data can be computed by the native function. The Emulator can be called to compute the real Target system emulated address and retrieve and marshal the data.

For example, suppose the function to be performed in Host architecture code includes searching a data structure in emulated memory. As each new location to be referenced is determined from the input parameters and required logical manipulation, a call would be made to a service function provided by the Emulator to have the generated target address (in DPS 9000 form) translated to a validated host virtual address. The data is then retrieved and moved to intermediate storage for use by the Host architecture code. Each time the translation service is called, bounds checking and virtual to real address translation via the emulated page tables is required.

One alternative is to pass the Target OS emulated data by reference, but this is fraught with two distinct problems. First, most multiple word memory areas may cross Target system page boundaries. The native routine would have to be prepared to accept a list of pointers to represent such an area. For many types of data, this would be a variable length list since most data is not page aligned.

Secondly, a pointer held by the native routine would be equivalent to a Translation Look aside Buffer ("TLB") entry. Therefore, the processor would not be able to respond to TLB entry cancel requests from other system entities until each such pointer was nullified. Normally, a processor can respond to such requests after every executed instruction. This requirement could severely limit the total amount of time that could be utilized by each native call.

One of the advantages of the memory emulation strategy described in the second method is that only the bounds checking is required because emulated virtual addresses can be used directly by Host architecture code. The translation to real addresses is handled by the host hardware mechanisms. On the other hand bound checking is typically not performed on array references by executing code.

Two fundamental approaches have been developed for mapping emulated Target architecture memory onto Host architecture system memory. Each approach implies different costs (performance and development) in the Emulator and depends on different support features in the Host OS. Both consider the Target Emulator program as an application running on a Host OS.

Each case assumes an Instruction Set Architecture ("ISA") that can conveniently handle the arithmetic necessary to perform the calculations for 34-bit virtual address calculations. This requirement was clearly not met by prior 32 bit processors. The advent of the 64-bit architecture enabled a solution to this fundamental problem.

The simplest approach is to assign a large region of Host memory as the emulated memory and have the Emulator treat this region as the real memory of the emulated Target machine. In this model, the Emulator must perform all of the translation steps to map each virtual memory reference to a host application address. First, the virtual address is computed and then a real address is computed by reference to various emulated page tables and page table pointers. An immediate implication is that the address space available to the Emulator program must be at least as large as the physical address space of the emulated machine. Since the current DPS 9000 machines support 1–16 GB and each emulated word takes two of the host words, an application memory of >32 GB may be needed.

A more attractive approach (for some factors) is to relieve the Emulator of virtual to real translation by mapping target virtual addresses directly to host application (Target system) virtual addresses. This can be done by recognizing that GCOS 8 Target OS manages virtual memory in distinct non-overlapping memory regions called Working Spaces. The largest systems manage up to 2500 Working Spaces of up to 4 GB in size. Rather than build page tables and manage the real memory for each of these Working Spaces, the virtual memory for each Working Space could be requested directly from the host O/S.

Those portions of the Target OS that build page tables and manage real memory would be eliminated or greatly modified. Target OS virtual memory management, within each Working Space, would remain unchanged. Implementation of this model requires both much larger application virtual memory and additional features in the host operating system.

The following paragraphs summarize the characteristics of the emulated memory the Emulator will preferably present to a Target OS such as GCOS 8. It must depend on the Host OS and hardware platform to enable these characteristics.

Such a Target OS must be assured the residency of the pages it sees as "real"; i.e., the Emulator must be able to pin those pages. Issues of page residency from the perspective of the Target OS will thus be under its control and the Target OS will make all the paging decisions exactly as it does now. This implies that the Host OS must allow an application to "pin" or fix at least 32 GB of its address space. This means that the Emulator must guarantee that these pages are not swapped out to secondary storage.

Multiple processors of the Host platform must have simultaneous access to the region used for Target memory emulation. This allows the emulation of a multiprocessor system. A shared region capability in the Host OS is required so that multiple processes can access this memory with full cache coherency. This requirement might be relaxed to imply multiple thread access if the threads of a single process can be simultaneously running at one time and the threads can share access to these regions.

This section describes some of the interfaces necessary to map the virtual addresses of the Target system directly to the virtual address space of the Host system. This means that after a Target virtual address is determined, then a simple transformation could be performed to change it into a Host system memory address. In the preferred embodiment, this Host system memory address is a Host system virtual memory address. The overhead of managing real memory could be moved to the Host system and the Emulator would not have to perform the steps necessary to transform the Target virtual address into a Target real address on each reference to memory.

Several issues arise with the process/thread flow when a Target system memory reference causes a Host system page fault. First, some Target system page faults are not legitimate. Therefore, an Emulator needs to get control after the page fault, but before the page fault is processed by the Host system, in order to perform basic validity checks. Second, the Host system may not be aware of the format of secondary storage where the data required for page-in is located. Therefore, control should be passed to the Target system for these page-in I/O operations. This function can be supplied by "external paging" interfaces as described in papers about the MACH operating system.

Thirdly, it is further desirable that a Target system processor which had been executing on an Emulator thread which took a page fault be allowed to execute while the page fault is being processed. Furthermore, when the page fault I/O is complete, then, and only then, can the instruction retry required for both the faulting Emulator code AND the emulated Target instruction be resumed or retried.

This invention provides a means that allows a uniprocessor or multi-processor Emulator and Host memory system to interact in such a fashion that the emulated capability of the Target processor can properly overlap with the paging I/O. In the preferred embodiment, the Host Operating System ("OS") is a commercially available OS such as Linux or AIX. However, other operating systems are within the scope of this invention.

On a multiprocessor emulation, it is common to utilize a Host thread to emulate each Target system processor. This simplifies concurrency control, such as gate locking, reentrancy, and the like.

One implication of this is that threads should be non-blocking since when an emulator thread blocks, the emulation of the corresponding processor blocks, severely impacting emulator throughput.

One instance where thread blocking naturally occurs is when the Host OS processes page faults occurring in either the emulator code, in emulated code, or data. This invention provides a mechanism that allows Host Operating System page faults to be processed effectively asynchronously from the view of emulated processors. This provides for the possibility of approaching 100% Host processor (CPU) utilization.

In this invention, the Emulator employs one thread for each Target processor being emulated. One key to this design is that one thread at a time will be used to emulate a Target processor. If the emulating procedure references memory generating a page fault, then another thread takes over the emulation of the Target processor before the Host system processes the page fault. After the page fault has been treated by the Host system, then the original thread is made eligible to resume Target processor emulation. In the preferred embodiment, any Target processor will suffice.

The Host Operating System page fault handler is modified, if necessary, to provide notification to the emulator whenever a page fault occurs in emulated code or data. The emulator page fault handler then passes emulation of the executing processor to another thread until the Host Operating System completes page fault processing, at which time the emulator is again notified by the Host OS in order to make that thread again eligible for execution.

Figure 9:
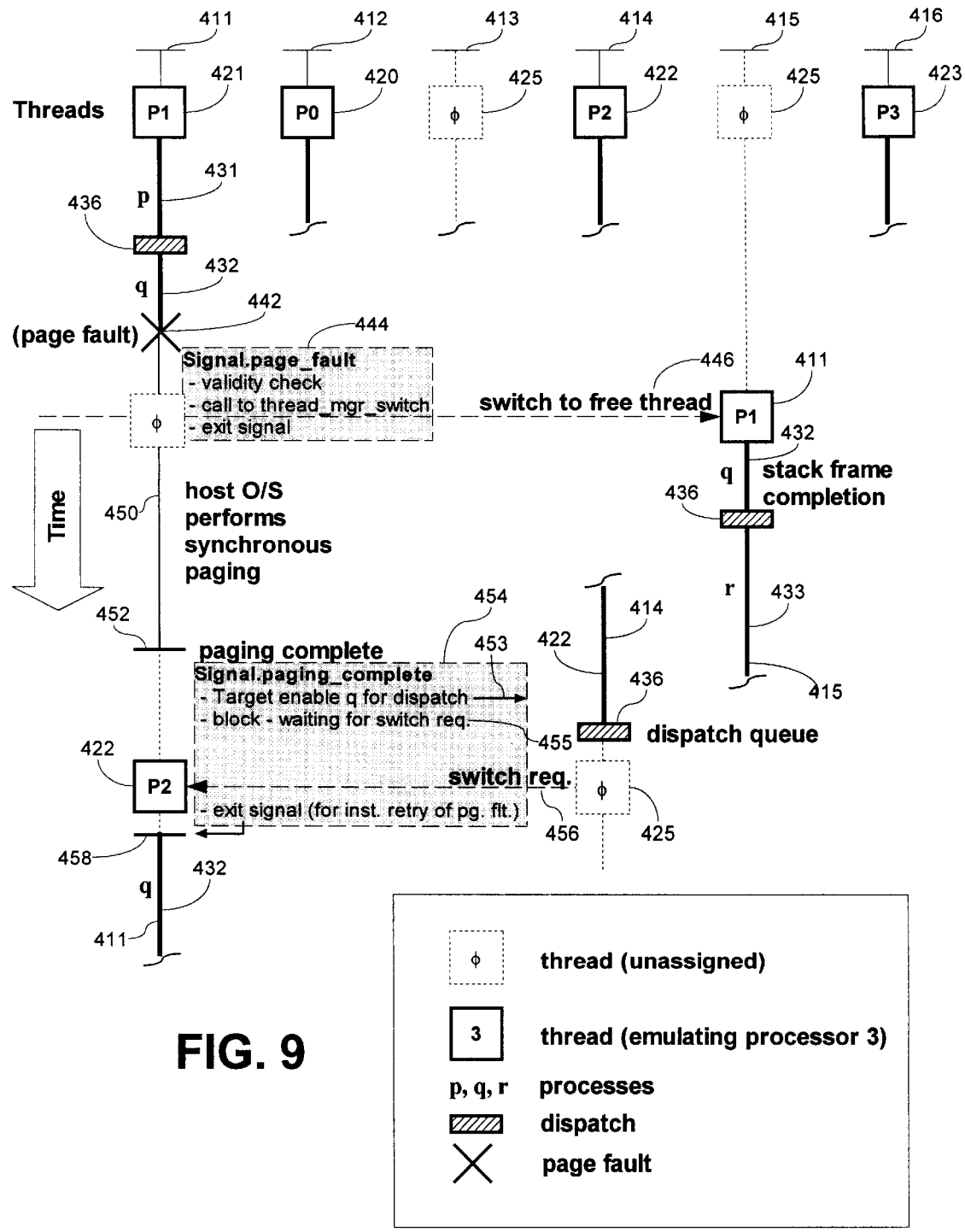
FIG. 9 is a block diagram illustrating the execution of threads emulating processors when a page fault is taken, in accordance with a preferred embodiment of the present invention.

FIG. 9 is a block diagram illustrating the execution of threads emulating processors when a page fault is taken, in accordance with a preferred embodiment of the present invention. The Emulator is configured with more threads than emulated processors. A thread manager (not depicted) maps one emulated processor to exactly one free thread. The Emulator executes the Target OS which maps its processes (and/or threads) to (emulated) processors during a scheduled dispatch by the Target OS. The number of free threads necessary for efficient operation of the emulation of the Target OS can be determined empirically.

In the preferred embodiment, the emulated Target OS organizes itself as a set of virtual memory regions. At the point where the Target OS would construct a page table to describe a virtual memory region, it instead calls the virtual memory service APIs of the underlying Host OS. Further references to that virtual memory region by the Target system are performed by use of the arithmetic formula which maps Target virtual addresses to Host virtual addresses.

In this embodiment, for example, a Target system word of memory of four bytes is emulated in eight bytes of Host memory. Therefore, a Target system virtual word address is multiplied by two (typically resulting in a left shift of one bit) in order to produce a Host system virtual word address offset. Alternatively, a Target system virtual word address is multiplied by eight (typically resulting in a left shift of three bits) in order to produce the equivalent Host system virtual byte address offset. In either case, the Host system virtual address offset is then added to a Working Space base address 482 (see FIG. 11) to form the effective Host system virtual address. In alternate embodiments, the Host system virtual address offset and effective Host system virtual address are equivalent.

If the instructions of the emulated Target OS reference a virtual address which is not currently mapped with real memory, then an actual page fault 442 results. This implementation utilizes a procedural call in the Host system memory management function to notify an exception handler within the address scope of the Emulator. This exception handler will verify the validity of the page fault for the faulting Target procedure and the area of Target memory being referenced. If the page fault is valid, then the process (or thread) stack of the Target process is prepared with an instruction retry frame which identifies this emulation thread for instruction retry.

The exception handler could be called with a standard signal mechanism. The figure suggests: Signal.page_fault 444. In this embodiment, the procedure is installed as an OS "driver" if that is required to assure the proper address space access and security.

The signaled exception procedure will then notify the thread manager that this thread is about to be blocked so that some other free thread can be selected to take the identity of this emulated processor. If no free threads are available, then this thread will retain the mapping of this target processor and allow the resumption of the faulting procedure as soon as the paging procedure is complete. In an alternative embodiment, another thread is spawned. After the notification of the thread manager, control is returned to the virtual memory manager of the underlying Host OS so that paging I/O can be started. This may involve page-out, page-in, or both.

It should also be noted that the external paging interfaces may be involved in order to allow the target interface to participate in a standard; ala, MACH, external asynchronous paging interface. (This is also not depicted in the included figure.) The MACH paradigm calls for the external pager to be in yet another process or thread. This alternative embodiment would be within the scope of this invention, since additional blocking of this thread is not an issue.

Control would be then be passed to this external pager after a real memory page had been obtained, but before it is installed in the desired page frame. This action is because another process may reference the same page.

When the paging I/O(s) is complete 452, the Host virtual memory manager provides another signal to the Emulator exception handler, Signal.paging_complete 454 with the status of the paging. Note that this is not trivial since nearly simultaneous page faults to the same shared pages can cause one thread to wait while another processes the fault. In the preferred embodiment, this is handled by the Host system and masked from the Emulator. Also note, that if the original call to the thread manager returned a status that there had been no free thread, as mentioned above, then this signal is treated as a null operation and the signal is immediately exited back to Host OS instruction retry. In this case, the Emulator and Target system are emulated correctly, though possibly not as efficiently as if a free thread had been found.

At this point the Emulator exception handler notifies 453 the Target OS that the process which had been mapped during the original page fault is eligible for scheduling (dispatch, in the preferred embodiment). In the preferred embodiment, this will be similar to the notification that occurs from an I/O channel when a Target I/O completes which also enables a waiting target process. The Emulator thread then blocks 455 waiting for a Target OS dispatch of the original emulated process.

Eventually, the emulated dispatcher of the target OS will select the original emulated process, process q, for scheduling (dispatch) 436. This will occur in an emulation thread currently executing dispatcher code. That thread will be mapped to one of the emulated processors of the target machine. The scheduling of this process, process "q", will cause the Emulator to resume execution using the Target system software stack (the safestore stack in the preferred GCOS 8 environment) which had been prepared immediately after the page fault described above. This Target system software stack frame will identify the original Emulator thread of the original fault. The currently executing Emulator thread will call the Emulator thread handler to notify 456 the original thread to unblock and begin execution with the identity of this thread's processor. This thread will then unmap from its current processor, mark itself free, and block waiting for further work.

The original thread will then map the processor of the notifying emulation thread to itself. The notifying thread is now blocked. That original thread will then resume the Target process from the software stack. The signal handler will exit to the Host OS which will then resume by performing instruction retry of the Emulator instruction which caused the page fault on behalf of the Target machine.

In this FIG. 9 six threads are shown, T1 411, T2 412, T3 413, T4 414, T5 415, and T6 416, with four emulated processors P0 420, P1 421, P2 422, and P3 423. Initially, processor P0 420 is mapped to thread T2 412, processor P1 421 is mapped to thread T1 411, processor P2 422 is mapped to.

Processor P1 421 mapped to thread T1 411 initially is executing process "p" 431. Then, control is given to the dispatcher 436, and another process "q" 432 is dispatched on this processor P1 421 and thread T1 411. A page fault 442 occurs in that thread T1 411, and a signal 446 is generated to signal the page fault 444. In response to that signal 446, the processor P1 421 is switched to a free thread T5 415. The process "q" 432 is placed in the dispatch queue 436 awaiting completion of the paging operation by thread T1 411. Another process "r" 433 is then dispatched 436 on the processor P1 421 and thread T5 415 pair.

Meanwhile the Host OS performs synchronous paging 450. When this paging is complete 452, the Host OS signals the emulator that the paging is complete. The emulator will enable the process "q" 432 in the dispatch queue 436 and make it eligible for dispatch 453. The thread T1 421 that just completed 452 the synchronous paging 450 then blocks in the signal handler awaiting activation 455 by a switch request which will occur as soon as process "q" 432 is dispatched. Ultimately, when it is the turn of this process "q" 432 to be dispatched 432, an active thread/processor pair, in this case processor P2 422 and T4 414, currently executing dispatcher code, removes the dispatch entry for this process "q" 432 from the dispatch queue and provides a "switch request" 456 to the original thread T1 411. That original thread (T1 411), assumes the processor identity (P2 422) of the notifying thread (T4 414). The original thread T1 411 then unblocks 458 and executes as processor P2 422 executing process "q" 432. Thread T4 414 is now free 425 and available for processor emulation.

Note that in this illustration, Host "threads" are used to execute Target "processes". The former is in keeping with systems today in which "threads" are dispatchable units of work that share a memory space. In this illustration, dispatchable units of work in the Target system are termed "processes". This is in accordance with the usage in the GCOS 8 operating system. However, other operating systems utilize other terminology, and other Host and Target dispatchable units of work are within the scope of this invention.

Figure 10:
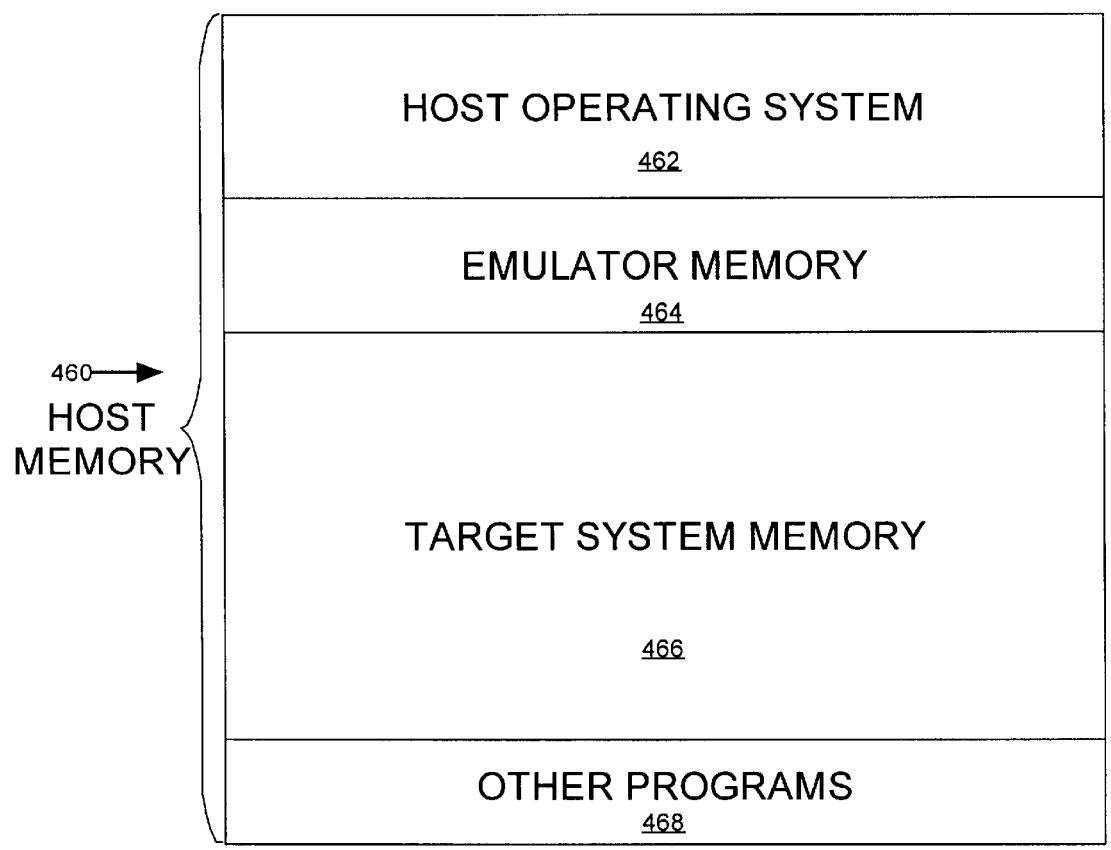
FIG. 10 is a diagram of the Host memory map, in accordance with a preferred embodiment of the present invention.

FIG. 10 is a diagram of the Host memory map 460, in accordance with a preferred embodiment of the present invention. In the Host memory 54, there is memory 462 assigned to the Host operating system, memory 464 assigned to the Emulator, memory 466 assigned to the Target System, and memory 468 assigned to other executing programs. While the physical memory assigned to these various software programs is shown as physically contiguous, this is done for illustrative purposes only. In some implementations, virtual memory will be allocated in a similar manner, while in other implementations, each will have its own virtual memory space.

Figure 11:
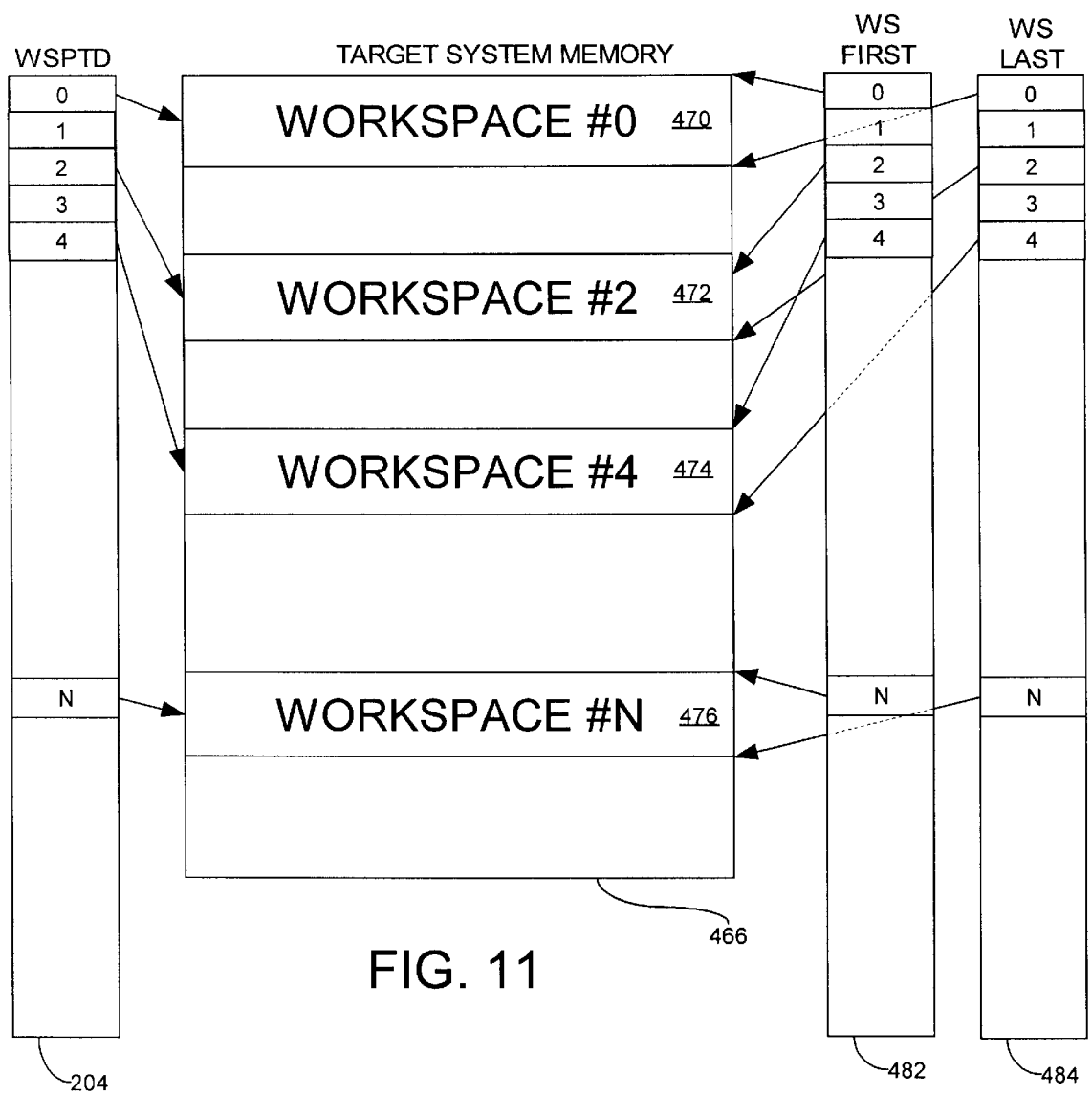
FIG. 11 is a diagram of the virtual memory map of the Target system memory, in accordance with a preferred embodiment of the present invention.

FIG. 11 is a diagram of the virtual memory map of the Target system memory 466, in accordance with a preferred embodiment of the present invention. In the preferred embodiment, the virtual memory is divided into "Working Spaces" (or "WORKSPACEs"). A WSPTD table 204 (see FIG. 4) defines the virtual memory for each Working Space. Four Working Spaces are shown in this FIG.: WS#0 470, WS#2 472, WS#4 474, and WS#N 476. Additionally, there is a Working Space Base Address array 482 and a Work Last Address array 484 with one entry in each array corresponding to each Working Space supported. When the Emulator generates an address relative to a Working Space 144 (see FIG. 2), this address is shifted if necessary to compensate for the difference in addressing between Host and Target systems, and is then added to the Working Space Base Address array 482 entry for the appropriate Working Space to form a Target system real memory address. The appropriate Working Space Base First Address is typically determined by indexing into the Working Space Base Address array 482 with the appropriate Working Space number 142. However, this value can be profitably carried in a register in certain instances, in particular, for the Working Space of the code currently being emulated. Additionally, the Target system Instruction Counter (IC) can be carried as a Host system virtual address, either converting back to an effective address within Working Space when necessary, or incremented in parallel to a Virtual Target IC. The generated Target system real memory address is a Host system virtual address. This address is validity checked against the appropriate Working Space Last Address array 484 entry. Alternatively, the Address within Working Space 144 can be validity checked against an appropriate entry in a Working Space Size array (not shown).

In the preferred embodiment, Working Spaces are dynamically created and destroyed during emulation of the Target system. Each Working Space, when active, consists of a contiguous span of Host system virtual memory. In one embodiment, a large pool of Host system virtual memory is allocated from the Host OS at startup and managed dynamically by the Target OS. This can be done utilizing well known memory management techniques. Alternatively, the Host virtual memory for each Working Space can be allocated whenever a new Working Space is created, and freed when the corresponding Working Space is destroyed.

In an alternate embodiment, some Host operating systems provide sufficient memory control to allow partial deallocation of virtual memory and provide an extremely large virtual address space. In this situation, an alternative to the above is to insert the Working Space number into the high order bits of the address within Working Space and use this as the Host system real memory address.

This embodiment was disclosed utilizing Working Spaces in the GCOS 8 environment. However, this is illustrative only of the preferred embodiment, and other similar mechanisms are within the scope of this invention. For example, the IBM MVS operating systems utilize Address Spaces and regions. Similarly, the Unisys OS 2200 operating system utilizes banks. These, and others, are considered comparable and within the scope of this invention. Herein, these mechanisms are termed "Working Spaces".

This embodiment discloses a set of base and limit tables indexed by Working Space number. However, this is illustrative only. In the preferred embodiment, the limit table is not necessary since working space limit checking is implicitly performed during segment processing. Also, other comparable mechanisms than linear arrays and vectors are within the scope of this invention.

In the GCOS 8 architecture, all memory references are relative to segment descriptors that specify either Working Spaces or Working Space Registers (WSR) that in turn specify Working Spaces. Segment descriptor selection for these memory references can be either explicit or implicit. Instructions are executed from an instruction segment loaded into an Instruction Segment Register (ISR). Many data references are also implicitly relative to the ISR. One of the fields in the ISR is the WSR selecting one of eight Working Space Registers. Each of the eight WSRs identifies one Working Space. The result is that when emulating the GCOS 8 architecture, instructions are fetched from that one selected Working Space. In the preferred embodiment, a base address for the Host System virtual memory base address for the Working Space containing code being emulated can be maintained efficiently in a Host system register. In other situations, the contents of the WSR being used can be used to index into the Working Space Base Address array 482.

The Working Space to be utilized in virtual-to-real address translation is determined in other ways in other computer architectures. For example, the legacy Unisys 1100 series of computers had a two bank (later four bank) system where the effective address was compared against bank bounds for determination of which bank was being referenced. The Unisys 2200 series added a mode where Address Space was indirectly selected by an instruction field. These and other comparable mechanisms for determination of the relevant Working Space are within the scope of this invention.

The GCOS 8 and OS 2200 architectures cited above support homogeneous Working Space memories. All of the virtual memory in a Working Space is of the same type. However, other computer architectures support heterogeneous Working Space memories that for example may contain intermixed extents of shared and non-shared memories. One method of implementing this invention in such an environment is allocate shared sections of Target system virtual memory at specified Host system virtual memory addresses that correspond to the appropriate Target system virtual memory addresses. This however requires more Host system virtual memory control than is available to emulators executing in some Host systems. An alternative is to utilize Working Space Mapping tables or arrays to map portions of Working Spaces to the different types or portions of Host system virtual memory.

Some of the benefits of this invention are therefore:

An Emulator does not need to emulate the virtual to real address mapping. The elimination of this requirement for mapping may save 5–15% or more of emulation cost.

The emulated OS does not need to perform real memory management. The procedures which had maintained page tables and real memory chains can be removed from the Target OS code. This can reduce the execution costs of some job streams by at least another 5%.

Another major benefit is that native co-processing routines coded in more performant commodity native (such as IA-64) code may be called by the Emulator directly on the same thread. Memory can be passed as Host native pointers to emulated Target segments or routines. The generated code would then refer to Target memory using Target virtual addresses modified by a simple arithmetic computation. In our model the modification is a multiply by two (or shift by one). The native software "typedefs" the emulated memory as an array of elements with the proper bit alignment and always uses compiler generated memory references.

If the native references to Target memory incur a page fault, then the above mentioned procedures allows an emulated processor to continue in another thread while the page fault is being processed. Ultimately, it will be an instruction in the native routine that will be retried after the page fault is complete. This allows for the possibility of Host CPU utilization approaching 100%.

By having an efficient means of referencing Target emulated memory from native software, a much wider set of candidate procedures in a Target OS can be identified which can be recoded from emulated software to native host software.

The Emulator is isolated from the intricacies of the instruction retry of the Host hardware platform.

Those skilled in the art will recognize that modifications and variations can be made without departing from the spirit of the invention. Therefore, it is intended that this invention encompasses all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A method of processing page faults when emulating a virtual memory target computer system on a host computer system, wherein said method comprises:
   A) receiving a notification of a page fault in a first thread having a first identification;
   B) testing whether the notification of the page fault is for a page in an emulated memory; and
   C) performing an emulator page fault processing for an emulated process when the page fault is determined in step (B) to be for the page in the emulator memory, wherein the emulator page fault processing comprises:
      1) transferring the first identification from the first thread to a second thread,
      2) activating the second thread to execute with the first identification, and
      3) processing the page fault for the first thread after activating the second thread.

2. The method in claim 1 wherein the emulator page fault processing further comprises:
   4) blocking of the first thread after completing a Host processing of the page fault.

3. The method in claim 2 wherein the emulator page fault processing further comprises:
   5) marking the emulated process as available for execution before blocking in substep (4).

4. The method in claim 3 which further comprises:
   D) detecting in a third thread having a second identification that the emulated process is available for execution;
   E) notifying the first thread to unblock from substep (4); and
   F) transferring the second identification from the third thread to the first thread.

5. The method in claim 2 wherein the emulator page fault processing further comprises:
   6) being activated from the blocking in substep (4) by a third thread.

6. The method in claim 5 wherein the emulator page fault processing further comprises:
   7) assuming a second identification from the third thread.

7. The method in claim 1 wherein:
   step (C) further comprises:
   4) testing whether a second thread is available for an execution, and
   5) performing a standard page fault processing when the second thread is not available for the execution.

8. The method in claim 1 which further comprises:
   D) performing a standard page fault processing when the page fault is determined in step (B) not to be for the page in the emulator memory.

9. The method in claim 1 wherein:
   the target system is a multiprocessor system having a first target system processor; and
   the first identification is a processor identification identifying the first target system processor.

10. A method of processing page faults when emulating a virtual memory multiprocessor target computer system having a plurality of target processors on a host computer system, wherein said method comprises:
    A) receiving a notification of a page fault in a first thread having a first processor identification identifying one of the plurality of target processors;
    B) testing whether the notification of the page fault is for a page in an emulated memory;
    C) performing an emulator page fault processing for an emulated process when the page fault is determined in step (B) to be for the page in the emulator memory, wherein the emulator page fault processing comprises:
       1) transferring the first processor identification from the first thread to a second thread,
       2) activating the second thread to execute with the first processor identification, and
       3) processing the page fault for the first thread after activating the second thread in substep (2),
       4) marking the emulated process as available for execution before blocking after processing the page fault in substep (3),
       5) blocking of the first thread after marking the emulated process in substep (4),
       6) being activated from the blocking in substep (4) by a third thread, and
       7) assuming a second processor identification identifying one of the plurality of target processors from the third thread,
    D) detecting in the third thread having the second processor identification that the emulated process is available for execution;
    E) notifying the first thread to unblock from substep (5); and
    F) transferring the second processor identification from the third thread to the first thread.

11. A data processing system containing emulation software for emulating a virtual memory target computer system on a host computer system included in the data processing system, wherein:
    the data processing system further comprises a Computer Software Storage Medium, and
    said emulation software comprises:
    A) a set of computer instructions stored in the Computer Software Storage Medium conditioning the host computer system for receiving a notification of a page fault in a first thread having a first identification;
    B) a set of computer instructions stored in the Computer Software Storage Medium conditioning the host computer system for testing whether the notification of the page fault is for a page in an emulated memory; and
    C) a set of computer instructions stored in the Computer Software Storage Medium conditioning the host computer system for performing an emulator page fault processing for an emulated process when the page fault is determined by the host computer system in set (B) to be for the page in the emulator memory, wherein the set of computer instructions for performing emulator page fault processing comprises:
       1) a set of computer instructions conditioning the host computer system for transferring the first identification from the first thread to a second thread,
       2) a set of computer instructions conditioning the host computer system for activating the second thread to execute with the first identification, and
       3) a set of computer instructions conditioning the host computer system for processing the page fault for the first thread after activating the second thread.

12. The data processing system in claim 11 wherein the set of emulator page fault processing instructions-further comprises:
    4) a set of computer instructions conditioning the host computer system for blocking of the first thread after completing a Host processing of the page fault.

13. The data processing system in claim 12 wherein the set of emulator page fault processing instructions further comprises:
    5) a set of computer instructions conditioning the host computer system for marking the emulated process as available for execution before blocking in subset (4).

14. The data processing system in claim 13 which further comprises:
    D) a set of computer instructions stored in the Computer Software Storage Medium conditioning the host computer system for detecting in a third thread having a second identification that the emulated process is available for execution;
    E) a set of computer instructions stored in the Computer Software Storage Medium conditioning the host computer system for notifying the first thread to unblock from subset(4); and
    F) a set of computer instructions stored in the Computer Software Storage Medium conditioning the host computer system for transferring the second identification from the third thread to the first thread.

15. The data processing system in claim 12 wherein the set of emulator page fault processing instructions further comprises:
    6) a set of computer instructions conditioning the host computer system for being activated from the blocking in subset (4) by a third thread.

16. The data processing system in claim 15 wherein the set of emulator page fault processing instructions further comprises:
    7) a set of computer instructions conditioning the host computer system for assuming a second identification from the third thread.

17. The data processing system in claim 11 wherein: set (C) further comprises:
    4) a set of computer instructions conditioning the host computer system for testing whether a second thread is available for an execution, and 5) a set of computer instructions conditioning the host computer system for performing a standard page fault processing when the second thread is not available for the execution.

18. The data processing system in claim 11 which further comprises:
D) a set of computer instructions stored in the Computer Software Storage Medium conditioning the host computer system for performing a standard page fault processing when the page fault is determined in set (B) not to be for the page in the emulator memory.

19. The data processing system in claim 11 wherein:
the target system is a multiprocessor system having a first target system processor; and
the first identification is a processor identification identifying the first target system processor.

20. Emulation software stored in a Computer Software Storage Medium in a data processing system for emulating a virtual memory target computer system on a host computer system, wherein:
said emulation software comprises:
A) a set of computer instructions stored in the Computer Software Storage Medium coded for receiving a notification of a page fault in a first thread having a first identification;
B) a set of computer instructions stored in the Computer Software Storage Medium coded for testing whether the notification of the page fault is for a page in an emulated memory; and
C) a set of computer instructions stored in the Computer Software Storage Medium coded for performing an emulator page fault processing for an emulated process when the page fault is determined in set (B) to be for the page in the emulator memory, wherein the emulator page fault processing instruction set comprises:
1) a set of computer instructions coded for transferring the first identification from the first thread to a second thread,
2) a set of computer instructions coded for activating the second thread to execute with the first identification, and
3) a set of computer instructions coded for processing the page fault for the first thread after activating the second thread.

21. A Non-Volatile Storage Medium containing Emulation software for use in a data processing system for emulating a paged virtual memory target computer system on a host computer system, wherein:
said emulation software comprises:
A) a set of computer instructions coded for receiving a notification of a page fault in a first thread having a first identification;
B) a set of computer instructions coded for testing whether the notification of the page fault is for a page in an emulated memory; and
C) a set of computer instructions for performing an emulator page fault processing for an emulated process when the page fault is determined in set (B) to be for the page in the emulator memory, wherein the emulator page fault processing set of instructions comprises:
1) a set of computer instructions coded for transferring the first identification from the first thread to a second thread,
2) a set of computer instructions coded for activating the second thread to execute with the first identification, and
3) a set of computer instructions coded for processing the page fault for the first thread after activating the second thread.

* * * * *